United States Patent
Brady et al.

[11] Patent Number: 6,066,287
[45] Date of Patent: May 23, 2000

[54] GAS ASSIST INJECTION MOLDING

[75] Inventors: Thomas E. Brady, Sylvania; Scott W. Steele, Perrysburg, both of Ohio

[73] Assignee: Plastic Technologies, Inc., Holland, Ohio

[21] Appl. No.: 09/113,830

[22] Filed: Jul. 10, 1998

[51] Int. Cl.[7] .......................... B29C 49/06; B29C 49/20
[52] U.S. Cl. .......................... 264/513; 264/537; 264/572
[58] Field of Search .................................. 264/572, 537, 264/513, 515

[56] References Cited

U.S. PATENT DOCUMENTS

| | | | |
|---|---|---|---|
| 4,101,617 | 7/1978 | Friedrich | 264/572 |
| 5,407,629 | 4/1995 | Schmidt et al. | |
| 5,584,470 | 12/1996 | Klotz | 264/572 |
| 5,611,988 | 3/1997 | Mahajan | 264/572 |
| 5,928,600 | 7/1999 | Chu | 264/572 |

FOREIGN PATENT DOCUMENTS

| | | | |
|---|---|---|---|
| 733330 | 9/1996 | European Pat. Off. | |
| 1-202413 | 8/1989 | Japan | 264/572 |
| 4-28507 | 1/1992 | Japan. | |
| 4-29807 | 1/1992 | Japan | 264/537 |

*Primary Examiner*—Catherine Timm
*Attorney, Agent, or Firm*—Donald R. Fraser

[57] ABSTRACT

A double-walled container is formed by gas assist injection molding. Thereafter, the container is further processed by 1) inserting a gas between the container layers, 2) injecting a colored liquid between the container layers, 3) evacuating the void space between the container layers, or 4) pressurizing the space between the container layers.

15 Claims, 2 Drawing Sheets

GAS ASSIST INJECTION MOLDING

This application is filed under the provisions of 35 U.S.C. 111(a) and claims the benefits of a provisional application Serial No. 60/052,486 filed Jul. 14, 1997 under the provisions of 35 U.S.C. 111(b).

FIELD OF THE INVENTION

The present invention relates generally to a gas assist injection molding process for making plastic containers, and to the plastic containers made thereby. More specifically, the invention is directed to a gas assist injection molding process for making a multi-layered plastic bottle, and subsequent processes for modifying the bottle to produce unique containers for various uses.

BACKGROUND OF THE INVENTION

Gas assist injection molding is known as a method for making molded plastic containers having excellent surface finish, lower weight, improved dimensional stability, higher stiffness-to-weight properties, etc. Moreover, gas assist injection molding results in improved processing capabilities such as, for example, reduced cycle times, lower mold cavity pressures, longer melt flow lengths, and the like.

It would be desirable to utilize gas assist injection molding to produce plastic containers that may be used for a variety of purposes; e.g, a container for carbonated beverages having improved carbon dioxide gas barrier properties, a container having improved insulating properties, a container which may be used for an aerosol application, etc.

BRIEF DESCRIPTION OF THE DRAWINGS

The novel features that are considered characteristic of the invention will best be understood from the accompanying description of specific embodiments when read in conjunction with the attendant drawings in which.

SUMMARY OF THE INVENTION

Accordant with the present invention, a process for making a variety of useful containers, employing gas assist injection molding, has surprisingly been discovered. Also contemplated in the present invention are the double walled containers so made. The process comprises gas assist injection molding a plastic parison in a manner so as to create a double-layered parison, blow molding the parison to form a double-layered container to a final configuration, and further modifying the molded container by: 1) inserting carbon dioxide or another gas between the container layers, 2) injecting a water-soluble colored fluid between the container layers, 3) creating a vacuum between the container layers, 4) creating an aerosol container by pressurizing the void space between the container layers, or the like.

DESCRIPTION OF PREFERRED EMBODIMENTS

Figure 1:
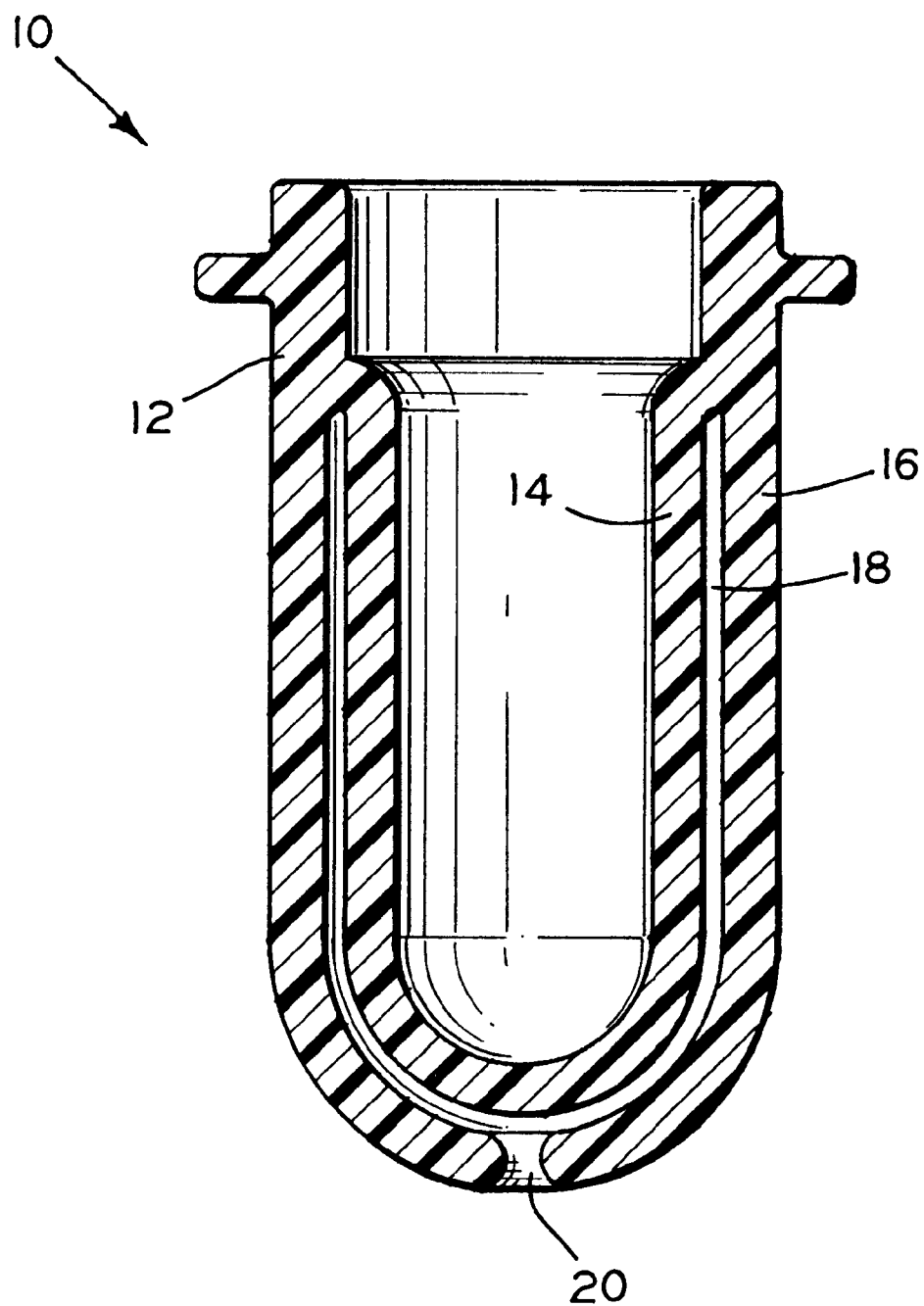
FIG. 1 is an elevational, sectional view illustrating an embodiment of a double walled parison formed according to the present invention, including an inner layer container and an outer layer container, a neck portion in which the inner and outer containers are fused together, and an aperture in the base of the outer container.

Referring now to FIG. 1, generally at 10, gas assist injection molding may be used to produce a double-layered parison 12, from which a double-layered container may be blow molded. This conventional technology allows for the creation of a "bottle within a bottle." The mold cavity is partially filled with a thermoplastic material, preferably polyethylene terephthalate, followed by the introduction of an inert gas into the polymer core. The injected, pressurized gas takes the path of least resistance through the molten thermoplastic, flowing towards the advancing polymer front through the thickest sections of the molten material. This effectively creates a double-layered parison 12 comprising an inner layer container 14 formed against the inner surface of the mold cavity and an outer layer container 16 formed against the outer surface of the mold cavity, with a void space 18 between the inner and outer containers 14 and 16, respectively. The thicknesses and other properties of the inner and outer containers 14 and 16, respectively, may be controlled by controlling the conditions under which the parison 12 is molded. For example, the wall of the inner container 14 may be formed very thin and the wall of the outer container 16 formed substantially thicker by maintaining the inner mold surface at a higher temperature than the outer mold surface, so that the laminar flow of molten thermoplastic ahead of the advancing gas occurs very near the inner mold surface due to the temperature profile across the parison 12 from the inner mold surface to the outer mold surface.

Figure 2:
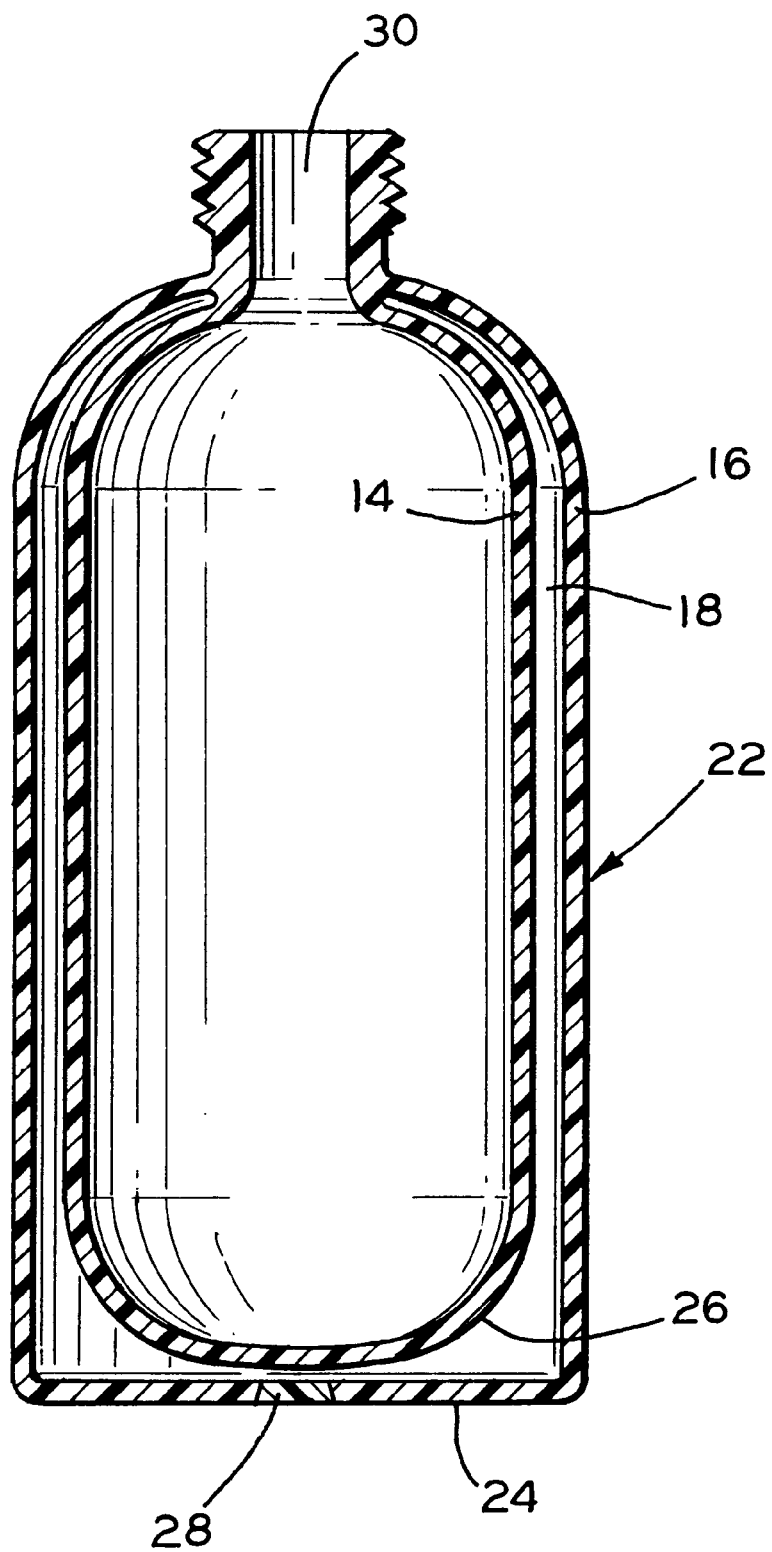
FIG. 2 is an elevational, sectional view illustrating a double-walled container formed from the parison illustrated in FIG. 1.

As illustrated in FIGS. 1 and 2, the double-walled parison 12 is then blow molded such that the inner and outer containers 14 and 16, respectively, are formed to their final configurations. During this blow molding step, an aperture 20 formed in the outer container allows the introduction of back pressure to a space or void 18 between the inner and outer containers 14 and 16, respectively, so that the inner container 14 may be formed to a different shape than the outer container 16. Thus, the inner container 14 need not conform to the outer container 16 during the blow molding process. In this way, for example, a double-walled container 22 may be formed wherein the outer container 16 has a flat circular base 24 while the inner container 14 has a convex hemispherical base 26.

Carbon dioxide or any other gas may be inserted into the void 18 between the inner and outer containers 14 and 16, respectively. The carbon dioxide gas would be retained in the void 18 by means of, for example, a plastic plug 28 which is inserted into the aperture so as to seal the void 18 by any convenient method such as solvent welding. This use of a gas in the void 18 creates a barrier to the diffusion of select materials out though the wall of the inner container 14. For example, where the inner container 14 is filled with a carbonated beverage and the inner container 14 is sealed with a conventional closure, carbon dioxide gas placed in the void 18 between the inner and outer containers 14 and 16, respectively, will slow the migration of carbon dioxide from the beverage out though the container 22 to the atmosphere, thereby increasing the shelf-life of the contained carbonated beverage. The rate of migration of carbon dioxide from the carbonated beverage out through the container 22 wall is at least partially based upon the concentration gradient of carbon dioxide between the inside and outside of the container 22. Because the carbon dioxide concentration within the container 22 is greater, the carbon dioxide tends to migrate to the exterior of the container 22 where the concentration of carbon dioxide is much less. Surrounding the inner container 14 with carbon dioxide by inserting carbon dioxide into the void 18 between the inner and outer containers 14 and 16, respectively, deters the migration of carbon dioxide by raising the concentration of carbon dioxide at the exterior surface of the inner container 14. By decreasing the carbon dioxide gradient across the wall of the inner container 14, the driving force for carbon dioxide migration is reduced.

As will be readily apparent to one ordinarily skilled in the art, the carbon dioxide inserted into the void 18 may be at atmospheric pressure, or may be at an elevated pressure equal to or greater than the pressure exerted against the inner surface of the inner container 14 by the carbonated beverage. Likewise, other gases may be inserted into the void 18 between the inner and outer containers 14 and 16, respectively, to give other barrier properties to the container 22.

In another embodiment, a water-soluble color bearing liquid such as water containing a vegetable dye may be injected into the void 18 between the inner and outer containers 14 and 16, respectively, thereby causing the container 22 to appear to be made of a colored plastic material. This would facilitate the recycling of the inventive double-walled container 22.

The emptied container 22 could be comminuted, and the water-soluble colored liquid removed in a simple washing process, thereby resulting in recycled clear pellets of thermoplastic material.

The inventive double-walled container 22 also has the advantage of being able to experience environmental stress cracking in the outer container 16 without communicating said cracks to the inner container 14. Thus, the inner container 14 would maintain its integrity, and the contained material would be preserved, despite the environmental stress cracking experienced by the outer container.

The inner container 14 may be formed (as described hereinabove) so that its wall thickness is very small. Thus, the inner container 14 could be made to collapse as the contained product is dispersed from the container 22, if the void 18 were vented to the atmosphere through the outer container 16.

Alternatively, a double-walled container 22 according to the present invention having a thin-walled inner container 14 could be used as an aerosol container. A pressurized gas or a reactive mixture which forms a gas could be placed in the void 18 between the thin-walled inner container 14 and thick-walled outer container 16. Thus, the pressure within the void 18 would collapse the inner container 14 and eject the contents in a controlled fashion though the opening 30 of the container 22.

Finally, the void 18 between the inner container and the outer container 14 and 16, respectively, could be evacuated through the aperture 20 in the outer container 16 which is thereafter sealed by a plug 28. This would result in a container 22 with improved insulating properties. For example, such a container 22 holding a cold carbonated beverage would remain colder longer in the hand of the consumer.

From the foregoing description, one ordinarily skilled in the art can easily ascertain the essential characteristics of this invention and, without departing from its spirit or scope, can make various changes and modifications to adapt the invention to various uses and conditions.

What is claimed is:

1. A process for preparing a double-walled container having a gas between the walls thereof, comprising:

gas assist injection molding a double-layered parison, including an inner layer and an outer layer, forming the layers so that said inner layer is thinner than said outer layer;

forming said parison into a double-walled container with an inner layer and an outer layer, said inner layer of said container being thinner than said outer layer of said container;

injecting a gas between said inner layer and said outer layer of said container; and confining said gas between said inner layer and said outer layer of the double-walled container.

2. The process for preparing the double-walled container according to claim 1 wherein said outer layer of said container includes an aperture therethrough.

3. The process for preparing the double-walled container according to claim 2 wherein said gas is injected through said aperture in said outer layer of said container, and said gas is confined by sealing said aperture after said gas is injected therethrough.

4. The process for preparing the double-walled container according to claim 1, wherein said gas is carbon dioxide.

5. The process for preparing the double-walled container according to claim 1, wherein said gas is contained between said inner layer of said container and said outer layer of said container at a pressure greater than ambient pressure.

6. The process for preparing the double-walled container according to claim 1, wherein said inner layer of said container and said outer layer of said container are formed to different configurations.

7. The process for preparing the double-walled container according to claim 1, wherein said outer layer of said container is formed to include a flat circular base.

8. A process for preparing a double-walled container having a colored liquid between the walls thereof, comprising:

gas assist injection molding a double-layered parison, including an inner layer and an outer layer, forming the layers so that said inner layer is thinner than said outer layer;

forming said parison into a double-walled container with an inner layer and an outer layer, said inner layer of said container being thinner than said outer layer of said container;

injecting a colored liquid between said inner layer and said outer layer of said container; and confining said colored liquid between said inner layer and said outer layer of the double-walled container.

9. The process for preparing the double-walled container according to claim 8 wherein said outer layer of said container includes an aperture therethrough.

10. The process for preparing the double-walled container according to claim 9 wherein said colored liquid is injected through said aperture in said outer layer of said container, and said colored liquid is confined by sealing said aperture after said colored liquid is injected therethrough.

11. The process for preparing the double-walled container according to claim 8, wherein said inner layer of said container and said outer layer of said container are formed to different configurations.

12. The process for preparing the double-walled container according to claim 8, wherein said outer layer of said container is formed to include a flat circular base.

13. A process for preparing a double-walled container having a vacuum between the walls thereof, comprising:

gas assist injection molding a double-layered parison, including an inner layer and an outer layer so that said inner layer is thinner than said outer layer, said outer layer including an aperture therethrough;

forming said parison into a double-walled container with an inner layer and an outer layer, said container having a void space between said inner layer and said outer layer, said inner layer of said container being thinner than said outer layer of said container;

evacuating the void space between said inner layer and said outer layer of said container through the aperture in said-outer layer of said container; and sealing the aperture, to maintain a vacuum within the void space between said inner layer and said outer layer of the double-walled container.

14. The process for preparing the double-walled container according to claim 13, wherein said inner layer of said container and said outer layer of said container are formed to different configurations.

15. The process for preparing the double-walled container according to claim 13, wherein said outer layer of said container is formed to include a flat circular base.

* * * * *